(12) United States Patent
MacKinnon

(10) Patent No.: US 6,320,889 B1
(45) Date of Patent: Nov. 20, 2001

(54) SOLID STATE LASER INCLUDING A SINGLE MODE GAIN SWEPT CONFIGURATION

(75) Inventor: Neil MacKinnon, San Jose, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/375,917

(22) Filed: Aug. 17, 1999

(51) Int. Cl.[7] .................................................. H01S 3/13
(52) U.S. Cl. ................................... 372/32; 372/29.02
(58) Field of Search ............................ 372/32, 31, 26, 372/28, 9, 29.022, 71, 72, 92, 109

(56) References Cited

U.S. PATENT DOCUMENTS

| | | |
|---|---|---|
| 3,824,492 | * 7/1974 | Brienza et al. ................ 331/94.5 |
| 4,656,635 | 4/1987 | Baer et al. . |
| 4,701,929 | 10/1987 | Baer et al. . |
| 5,031,182 | 7/1991 | Anthon et al. . |
| 5,052,815 | 10/1991 | Nightingale et al. . |
| 5,123,026 | * 6/1992 | Fan et al. ............................ 372/75 |
| 5,263,038 | * 11/1993 | Lukas et al. ........................ 372/22 |
| 5,272,708 | * 12/1993 | Esterowitz et al. ................ 372/20 |
| 5,521,930 | * 5/1996 | Suni et al. .......................... 372/13 |
| 5,627,849 | 5/1997 | Baer ................................... 372/31 |
| 5,995,523 | * 11/1999 | Xie ..................................... 372/22 |

OTHER PUBLICATIONS

J.J. Zayhowski, The Effects of Spatial Hole Burning and Energy Diffusion on the Single–Mode–Operation of Standing–Wave Lasers, IEEE Journal of Quantum Electronics, vol. 26, No. 12, Dec. 1990.

J.J. Zayhowski, Limits imposed by spatial hole burning on the single–mode operation of standing–wave laser cavities, Optics Letters, vol. 15,No. 8, Apr. 15, 1990.

H. G. Danielmeyer and W. G. Nilsen, Spontaneous Single –Frequency Output from a Spatially Homogeneous Nd:YAG Laser, Feb. 1, 1997, Applied Physics Letters, vol. 16, No. 3.

H. G. Danielmeyer and E. H. Turner, Electro–Optic Elimination of Spatial Hole Burning in Lasers, Dec. 15, 1970, Applied Physics Letters, vol. 17, No. 12.

* cited by examiner

Primary Examiner—Teresa M. Arroyo
Assistant Examiner—Davienne Monbleau
(74) Attorney, Agent, or Firm—Michael Pritzkau

(57) ABSTRACT

A single mode laser is described including a gain swept configuration. The laser includes an input mirror and an output mirror defining a resonant cavity and a light path within the resonant cavity and between the mirrors. A laser gain material is positioned at a predetermined location along the light path and arranged with a predetermined gain length along the light path for producing light at the desired output wavelength such that a standing wave pattern at the desired output wavelength is formed within the cavity between the mirrors. The gain material is capable of producing light at other, unwanted wavelengths which can potentially form other standing wave patterns. All of the wavelengths are produced with some gain. Oscillation means is provided for varying the length of the light path which, by varying the length of the light path a sufficient amount, causes the standing wave pattern of the desired output wavelength to oscillate as a traveling wave along the light path such that the standing wave pattern moves through at least substantially the entire gain length of the gain material along the light path for extracting substantially all of the available gain from the gain material, whereby only the desired output wavelength lasers.

26 Claims, 4 Drawing Sheets

SOLID STATE LASER INCLUDING A SINGLE MODE GAIN SWEPT CONFIGURATION

BACKGROUND OF THE INVENTION

The present invention relates generally to single frequency solid state lasers and, more particularly, to solid state lasers that operate at a single output frequency by extracting gain at this single output frequency from the entire length of the gain material.

In laser applications such as, for example, data transmission, telecommunications, and sensing, it is desirable to have a compact, low cost, efficient, solid state laser which operates at a single frequency. Unless special provisions are made, a conventional solid state laser operates at multiple frequencies, or axial modes, which compete for the available gain in the laser gain material. This phenomenon is known as spatial hole burning and results from standing wave patterns which selectively deplete the gain in only a limited portion of the gain material. Once a particular portion of the gain material is depleted, standing wave patterns corresponding to other, undesired frequencies can become active in the other portions of the gain material, thus giving rise to multimode operation of the laser.

A known method for achieving single frequency operation of a solid state laser involves insertion of intracavity elements, such as Lyot filters or Fabry-Perot etalons, within the laser cavity so as to induce differential loss among the various modes. The losses are at a level sufficient to extinguish the undesired modes, such that only one axial mode is permitted to lase while the undesired modes are suppressed, but are nonetheless present below their lasing thresholds (see, for example, U.S. Pat. Nos. 4,656,635 and 4,701,929 to Baer). One disadvantage of this method is the insertion loss attributable to the intracavity elements. In addition, the presence of undepleted inversion within the gain material lowers the efficiency of the laser. That is, the method does not take advantage of all of the gain available in the gain material. Furthermore, with regard to assembly concerns, the laser design becomes more complicated due to the need for the intracavity elements. Often, the resulting laser is difficult to align and sensitive to changes in environmental factors such as temperature.

Another prior art method used to attain single frequency solid state laser operation is the elimination of spatial hole burning to ensure that one axial mode uniformly depletes the available gain. Thus, the other, undesired modes are not merely suppressed below lasing threshold to avoid the possibility of their lasing, but are completely deprived of gain. The most commonly used methods of this type are the so-called "twisted mode" method (see U.S. Pat. No. 5,031,182 to Anthon et al.) and the ring laser method (see U.S. Pat. No. 5,052,815 to Nightingale et al.). In the twisted mode method, a combination of two quarterwave plates and a polarizer is used to circularly polarize the principal axial mode at the gain material to force the electric field vector of the principal axial mode to traverse in a helical pattern through the gain material, thus extracting the inversion uniformly. In a ring laser configuration, only one mode is allowed to oscillate by the use of non-reciprocal optical isolators. The unidirectional operation forces the principal axial mode to oscillate as a unidirectional travelling wave, thus uniformly extracting the available inversion and eliminating spatial hole burning. Unfortunately, the twisted mode and ring laser methods still typically require the presence of intracavity elements which, as mentioned above, introduce insertion losses, operation inefficiency, design complications, and sensitivity to environmental factors.

Still another prior art method for achieving single frequency output from a solid state laser by elimination of spatial hole burning involves physically moving the laser gain material back and forth within the laser resonator cavity. See H. G. Danielmeyer and W. G. Nilsen, Appl. Phys. Lett. 16, 124 (1970) (hereinafter Danielmeyer). This "gain sweeping" method, to a limited extent, mimics the behavior of gas lasers, where thermal motion of the atoms in the gain material essentially prevents spatial hole burning. Specifically, if the atoms of the gain material are in motion with respect to the nodal planes of the principal axial mode, the extraction of the available gain becomes spatially averaged through the gain material, thus yielding single frequency operation of the laser. Hence, in applying the method to a solid state laser, when the gain material is swept through the standing wave corresponding to the principal axial mode at a sufficiently large oscillation rate and oscillation amplitude, spatial hole burning can be eliminated and single frequency operation can be achieved. This method has been used to achieve stable, single mode operation of a flash lamp-pumped, Nd:YAG laser with a laser cavity length of 72 cm by moving the Nd:YAG rod, with an optical length of 5.5 cm long, by a longitudinal distance of ±15 cm at a rate of 0 to 10 cm/s.

It has also been suggested that a similar gain sweeping effect may be achieved by keeping the gain material fixed and somehow moving the nodal planes of the wave pattern corresponding to the principal axial mode. An electro-optic method for achieving this effect in a flash lamp-pumped, Nd:YAG laser is shown by Danielmeyer et al., Appl. Phys. Lett. 17, 519 (1970). Accordingly, a lithium niobate phase modulator is placed within the laser cavity at each end of the laser gain material to modulate the polarization state of the electric field corresponding to the principal axial mode. When the lithium niobate crystals are modulated at a predetermined frequency, with each crystal driven out of phase, the principal axial mode cannot establish a standing wave pattern, and hence the available gain is utilized efficiently.

The aforementioned electro-optic approach suffers a disadvantage in common with the differential loss, twisted mode, and ring laser methods in that intracavity elements are required. In addition, to avoid extra resonances, the surfaces of the lithium niobate crystals are typically held at an angle with respect to the light path, which leads to additional insertion losses.

The present invention introduces a highly advantageous and heretofore unseen single mode laser and associated method which utilize a swept gain extraction configuration.

SUMMARY OF THE INVENTION

As will be described in more detail hereinafter, there is disclosed herein a single mode laser including a gain swept configuration. The laser includes an input mirror and an output mirror defining a resonant cavity and a light path within the resonant cavity and between the mirrors. A laser gain material is positioned at a predetermined location along the light path and arranged with a predetermined gain length along the light path for producing light at the desired output wavelength such that a standing wave pattern at the desired output wavelength is formed within the cavity between the mirrors. The gain material is capable of producing light at other, unwanted wavelengths which can potentially form other standing wave patterns. All of the wavelengths are produced with some gain. Oscillation means is provided for varying the length of the light path which, by varying the length of the light path a sufficient amount, causes the standing wave pattern of the desired output wavelength to oscillate as a traveling wave along the light path such that the standing wave pattern moves through at least substantially the entire gain length of the gain material along the light path for extracting substantially all of the available gain from the gain material, whereby only the desired output wavelength lases.

DETAILED DESCRIPTION OF THE INVENTION

Figure 1:
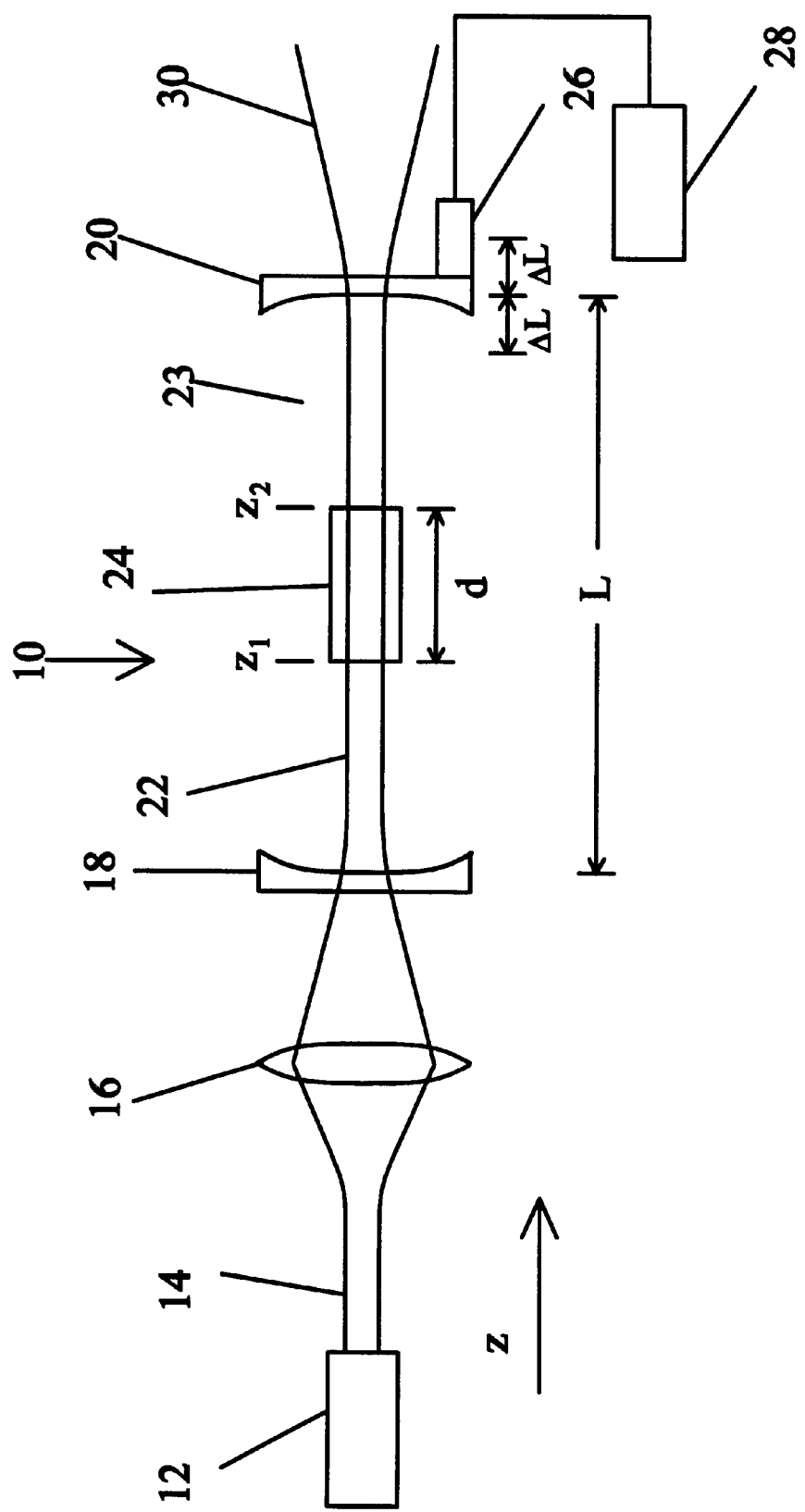
FIG. 1 is a diagrammatic illustration of a solid state laser manufactured in accordance with the present invention shown here to illustrate an oscillation arrangement for modulating the position of an output mirror.

Turning now to the drawings wherein like components are designated by like reference numbers, attention is directed to FIG. 1, which illustrates one implementation of an end-pumped solid state laser, generally indicated by the reference number 10. Laser 10 includes a pump source 12, which emits a source output light 14. Source output light 14 is sent through collimating optics 16, and directed through input mirror 18. Input mirror 18 and an output mirror 20 define a light path 22 within a resonant cavity 23 formed between the mirrors. The length of the resonant cavity is indicated as L. A laser gain material 24, having a length d along light path 22, is positioned within resonant cavity 23 in light path 22.

An oscillatory arrangement 26 is attached to output mirror 20. Oscillatory arrangement 26 is configured to vary the position of output mirror 20 by a distance $\Delta L$ with respect to input mirror 18, such that the length L of the resonant cavity 23 is modulated. It is noted that dimensions have been exaggerated in the figures for illustrative purposes. Specific details regarding the configuration of the oscillatory arrangement will be provided at an appropriate point below. The motion of oscillatory arrangement 26 is regulated by a controller 28. During operation of the laser, a fundamental desired mode (not shown) having the highest gain cross section will initially arise in a particular standing wave pattern. In accordance with the present invention, the oscillatory change, two times $\Delta L$, in the resonant cavity length L, and consequently the length of light path 22, causes the standing wave pattern corresponding to the desired output wavelength to be swept through gain material 24, in a highly advantageous way which extracts, or "sweeps" out, all of the available gain at the desired longitudinal mode while suppressing the other, unwanted modes. Hence, spatial hole burning at the desired wavelength is eliminated and laser 10 emits a single longitudinal mode output 30 only at the desired wavelength.

Still referring to FIG. 1, unlike the prior art, the gain-sweeping effect is achieved in this invention by the oscillatory change in the resonant cavity length L, and consequently the length of light path 22. Although this resonant cavity length modulation is achieved in the laser shown in FIG. 1 by oscillatory movement of output mirror 20, it would be equally applicable to achieve gain sweeping by various other implementations, such as, for example, by oscillatory movement of input mirror 18.

The optimum position of gain material 24 is determined by analyzing the wave patterns corresponding to the desired wavelength as the length of the resonant cavity length is modulated. If the intensity pattern (i.e., standing wave pattern) corresponding to the desired wavelength with a resonant cavity length L is defined as mode 1, the intensity pattern corresponding to the desired wavelength with a resonant cavity length $L+\Delta L$ can be defined as mode 1* (since the wavelength remains the same; mode 2 would indicate a change in wavelength).

The wave numbers $k_1$ and $k_{1^*}$ corresponding to modes 1 and 1* can be written mathematically as:

$$k_1 = \frac{\pi N}{2L} \quad (1)$$

and $$k_{1^*} = \frac{\pi N}{2(L+\Delta L)}, \quad (2)$$

where integer N is equal to the number of cycles within the resonant cavity. Note that the only difference between $k_1$ and $k_{1^*}$ is the addition of a $\Delta L$ term in the denominator of $k_{1^*}$; N is the same for both wave numbers since the wave numbers correspond to modes with the same wavelength.

With the above description in equations (1) and (2), the notation and logic of Zayhowski is now adapted as described in Opt. Lett. 5, 431 (1990) and IEEE J. of Quantum Electron. QE-26, 2052 (1990). To that end, the extraction of gain from the laser gain material in the presence of the modes is dependent on the inversion profile $N_0(z)$ in the absence of saturation. Note that z is defined as the axial position along the light path measured from the input mirror 18 toward the output mirror 20. As shown in FIG. 1, $z_1$ and $z_2$ are defined as the locations of the edges of the gain material 24 along the z-axis. Then a correlation factor $\Psi(1,1^*)$, which expresses the spatial overlap between the inversion profile $N_0(z)$ and the intensity patterns associated with modes 1 and 1*, can be written as $$\Psi(1, 1^*) = \left[\frac{1}{\int_{z_1}^{z_2} N_o(z)\,dz}\right]\left[\int_{z_1}^{z_2} N_o(z)\cos(2(k_1 - k_{1^*})z)\,dz\right]. \quad (3)$$

In achieving a single mode laser using the gain sweeping technique of the present invention, ideal operation occurs when the peaks in the standing wave patterns corresponding to the two modes are as far apart as possible at the position of the gain material 24. In other words, modes 1 and 1* should be anti-correlated at the gain material 24, meaning the correlation factor $\Psi(1,1^*)$ should equal −1 at the location of gain material 24. In this way, the anti-correlation is physically achievable with a minimal oscillation amplitude of the resonant cavity length so as to improve reliability and improve manufacturability of oscillatory arrangement 26.

Figure 2A:
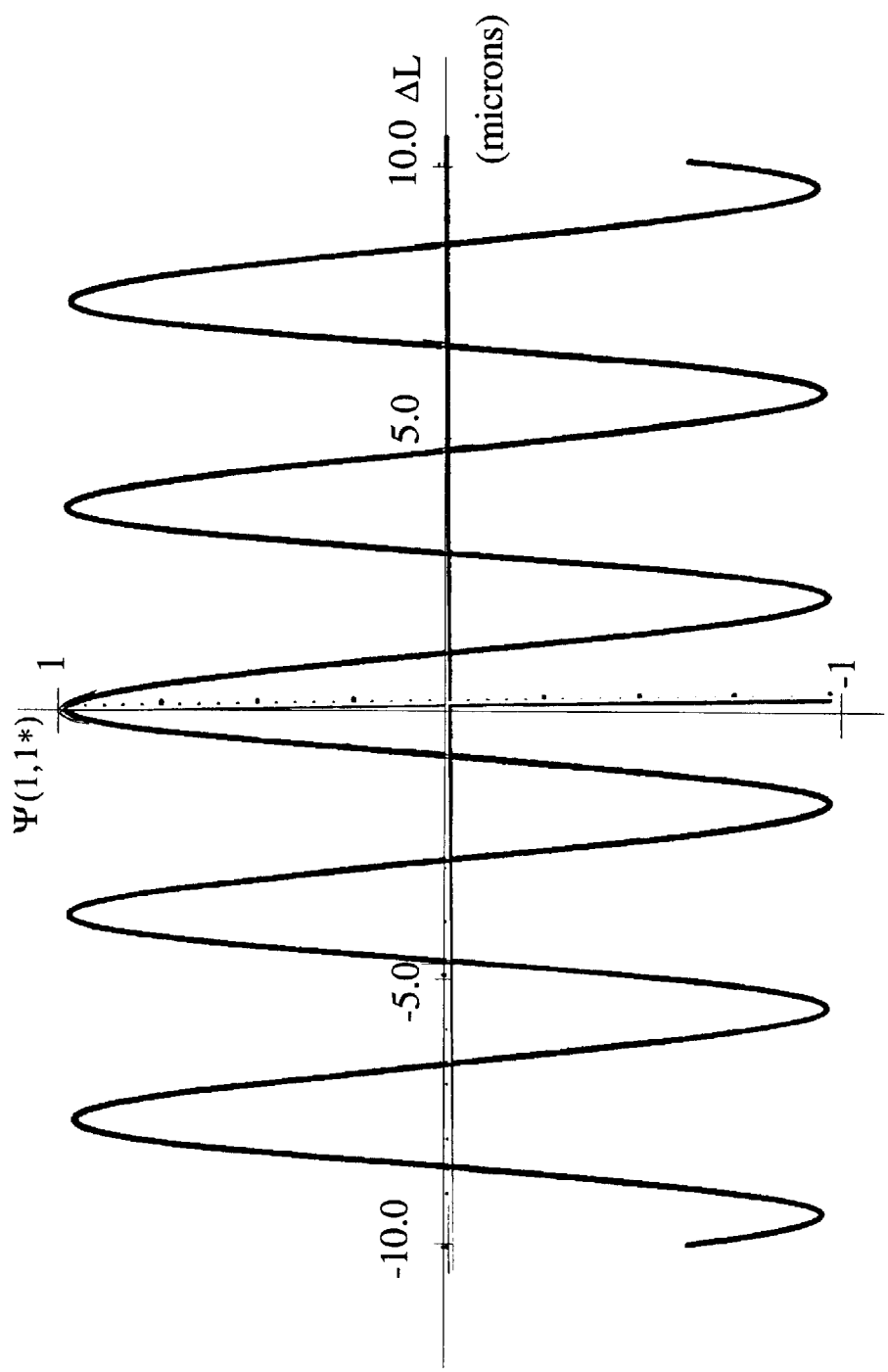
FIG. 2A is a plot of the correlation factor $\Psi(1,1^*)$, which corresponds to the spatial overlap of the intensity patterns of the modulated longitudinal modes in the resonant cavity, as a function of the change in the resonant cavity length $\Delta L$ in the case where the gain material is placed at the center of the resonant cavity.
Figure 2B:
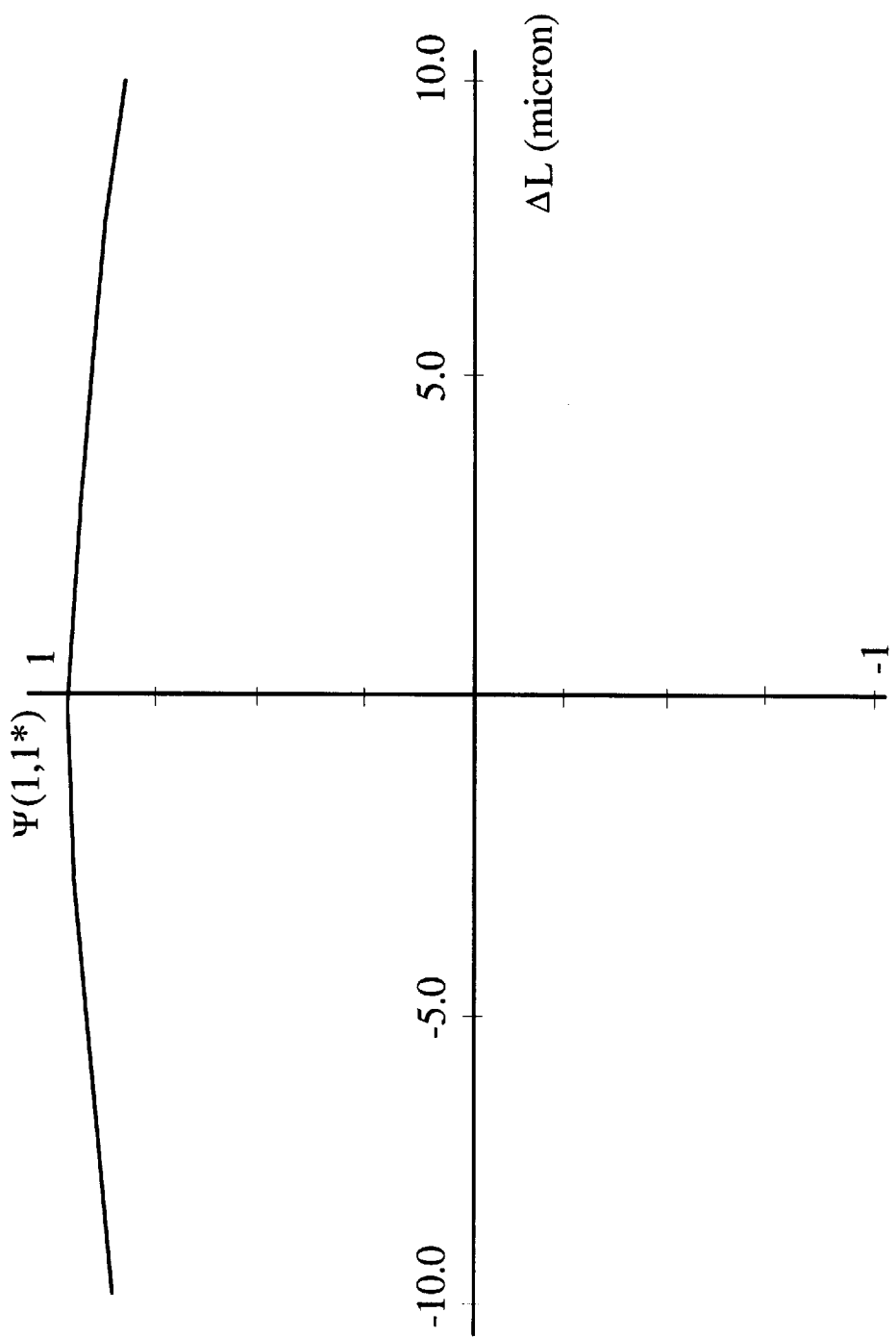
FIG. 2B is a plot of the correlation factor $\Psi(1,1^*)$ as a function of the change in the resonant cavity length $\Delta L$ in the case where the gain material is placed within the resonant cavity and adjacent to the input mirror.

Referring now to FIGS. 1, 2A and 2B, plots of $\Psi(1,1^*)$ are shown as functions of $\Delta L$ for use in determining the optimum position of the gain material. FIG. 2A shows a plot of the correlation factor as a function of $\Delta L$ for the case where gain material 24 is placed at the center of the resonant cavity, as illustrated in FIG. 1, for purposes of calculation, while FIG. 2B shows a plot of the correlation factor as a function of $\Delta L$ for the case where gain material 24 is placed within the resonant cavity and adjacent (not shown) to the input mirror. Due to the symmetry of the components which compose the resonant cavity, the FIG. 2B plot will be obtained in the case where the gain material is placed within the resonant cavity adjacent to the output mirror. Both plots are calculated for the case of a resonant cavity length L=20 mm, gain material length d=0.5 mm, and N=21100.

As can be seen in FIG. 2A, anti-correlation ($\Psi(1,1^*)=-1$) can be achieved with a resonant cavity length modulation of less than 3 $\mu$m. In this regard, such a value of resonant cavity length modulation is physically achievable using, for example, a piezoelectric translation block (not shown) for oscillatory arrangement 26 (FIG. 1), which may be designed by one of ordinary skill in the art. However, any other suitable arrangement is considered to be within the scope of the present application, so long as the oscillatory requirements are met, consistent with the teachings herein.

FIG. 2B shows the case where gain material 24 is assumed to be immediately adjacent (not shown) to the input mirror. In this case, anti-correlation cannot be achieved with a resonant cavity length modulation of even as large as 10 $\mu$m. Inability to achieve full gain extraction from the gain element in this position is also a consequence of the boundary condition that all possible wavelengths of any linear resonator must have a standing wave minimum at the cavity defining mirrors. It is submitted that cavity length modulation levels of 8 $\mu$m or more are impractical since reliability will likely decrease with increasing cavity length modulation due to increased propensity for the laser to mode hop to another frequency during the gain sweeping cycle. As noted above, the same plot would be obtained if gain material 24 were positioned next to the output mirror, due to the symmetry of the system. Hence, a single mode laser is considered as impractical using the gain sweeping technique of the present invention when the gain material is positioned at either end of the resonant cavity adjacent to a mirror.

In generating plots of the correlation factor $\Psi(1,1^*)$ as a function of $\Delta L$ for various gain material placements, it is found that positioning gain material 24 at the center of resonant cavity 23 yields the smallest required oscillation amplitude $\Delta L$ of the resonant cavity length. Therefore, by this graphical method, it can be concluded that the optimum position of gain material 24 is at or near the center of resonant cavity 23.

It should be noted that a single mode laser using the gain sweeping technique of the present invention can be achieved with resonant cavity length modulation even if the gain material is offset from the center of the resonant cavity, provided that a large enough oscillation amplitude of the resonant cavity length can be provided by oscillation arrangement 26 and that the gain material thickness is of a suitable value. As mentioned previously, practical levels of cavity length modulation are considered to be less than approximately 8 $\mu$m. Even in such an offset configuration, it should be appreciated that the present invention is highly advantageous since the gain sweeping technique is implemented with no additional intracavity elements, thus minimizing the losses due to elements within the resonant cavity and maximizing the efficiency with which single mode operation is achieved.

In devising a gain swept configuration with a fixed gain material, as described in the Background section, Danielmeyer requires that the cavity length remain constant "within very small limits" to achieve a stable output. Due to this requirement, Danielmeyer was forced to use a pair of phase modulator crystals within the resonator cavity to electro-optically achieve gain sweeping. Unfortunately, in this approach, the addition of the crystal pair results in increased insertion loss. In this regard, it should be emphasized that the use of intracavity elements in the manner of Danielmeyer is not required in accordance with the teachings herein and, in fact, the use of intracavity elements to accomplish single frequency operation is considered as unacceptable due to accompanying insertion losses.

With the advent of modern solid state lasers, which require resonant cavity lengths on the order of only a few centimeters and gain materials which are on the order of only a few millimeters in length along the light path, Applicants have recognized that gain-sweeping in accordance with the present invention can be accomplished with light path length modulation of only a few microns in amplitude (e.g., 3 $\mu$m oscillation amplitude, as described with regard to FIG. 2A). Hence, despite Danielmeyer's direct teaching against variation of cavity length, sufficiently stable, single mode laser operation is achieved by modulating the resonator cavity length to change the light path length. Specifically, with the gain material placed at or sufficiently near its optimum position, as calculated using the aforedescribed graphical method, the present invention enables the implementation of a single mode laser using the gain swept configuration without additional intracavity elements by physically modulating the length of the resonator cavity.

Figure 3:
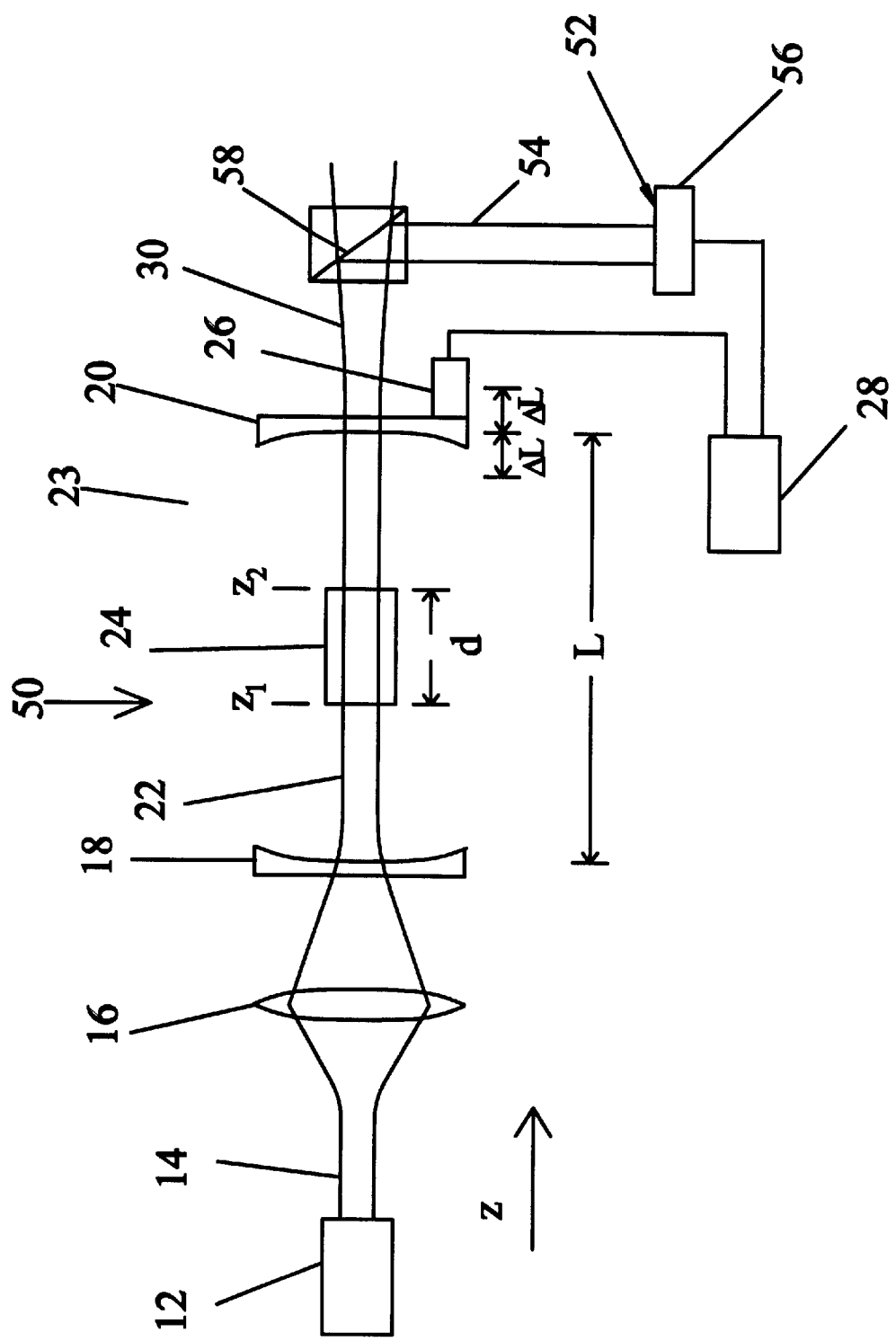
FIG. 3 is a diagrammatic illustration of a solid state laser manufactured in accordance with the present invention shown here to illustrate a feedback loop forming one part of an oscillation arrangement for modulating the position of the output mirror for providing further stabilization of the output light.

FIG. 3 shows another laser manufactured in accordance with the present invention and generally indicated by the reference number 50. Laser 50 is essentially identical to previously described laser 10 with the exception that a feedback loop 52 has been added for purposes of providing highly stable output light. To that end, a portion 54 of output 30 is diverted and directed into a detector 56 by a partially reflective mirror 58. A detected intensity signal is sent to controller 28. Controller 28 is configured to automatically adjust the modulation frequency and amplitude produced by oscillatory arrangement 26 to stabilize the intensity of laser output 30. The feedback loop may be desired when it is required to stabilize the single mode laser output as much as possible in view of a particular application such as, for example, those requiring a high degree of amplitude stability in the laser output. An example of such an application would be the case of digital photo-finishing wherein periodic amplitude fluctuations in the laser output give rise to "banding" problems, perceptible to the human eye, in the generation of photographic prints.

Since the laser and associated method disclosed herein may be provided in a variety of different configurations and the method may be practiced in a variety of different ways, it should be understood that the present invention may be embodied in many other specific ways without departing from the spirit or scope of the invention. Therefore, the present examples and methods are to be considered as illustrative and not restrictive, and the invention is not to be limited to the details given herein, but may be modified within the scope of the appended claims.

What is claimed is:

1. A single frequency end-pumped solid state laser comprising:

an input mirror and an output mirror defining a resonant cavity and a light path within the resonant cavity and between the mirrors;

a laser gain material positioned at a predetermined location along said light path arranged with a predetermined gain length along the light path for, producing light at a desired output wavelength such that a standing wave pattern at said desired output wavelength of light is formed within said cavity between said mirrors, and potentially producing light at other, unwanted wavelengths which potentially form other standing wave patterns, all of said wavelengths extracting gain from within said laser gain material; and oscillation means for producing a continuous oscillatory change in resonant cavity length of said light path, by varying the length of said light path a sufficient amount, causes the standing wave pattern of the desired output wavelength to oscillate as a traveling wave along said light path such that the standing wave pattern moves through at least the entire gain length of said gain material for extracting substantially all of the gain of said gain material, whereby only said desired output wavelength lases.

2. The laser of claim 1 wherein said oscillation means varies the length of said light path at a predetermined frequency and modulation amplitude.

3. The laser of claim 2 wherein said oscillation of the traveling wave pattern corresponding to the desired output wavelength occurs over a modulation amplitude less than ±1% of the length of said light path.

4. The laser of claim 2 wherein said laser gain material is positioned in said light path at said predetermined location such that peaks in the particular standing wave corresponding to said desired output wavelength and potential peaks in the other standing wave patterns corresponding to said unwanted wavelengths do not overlap along said gain length, so that the variation of the length of said light path is sufficiently small as compared to the overall length of said light path to extract gain from the entire gain length of said laser gain material using only the desired output wavelength.

5. The laser of claim 4 wherein said laser gain material is positioned in said light path at a predetermined location, substantially centered between said mirrors, such that the particular standing wave corresponding to the desired output wavelength and the other standing wave patterns corresponding to the unwanted wavelengths are out of phase by a phase factor greater than 0 radians at said predetermined location.

6. A single frequency end-pumped solid state laser comprising:

an input mirror and an output mirror defining a resonant cavity and a light path within the resonant cavity and between the mirrors;

a thin laser gain material having a predetermined gain length along said light path of less than approximately two millimeters and positioned at a predetermined location along said light path, producing light at a desired output wavelength such that a standing wave pattern at said desired output wavelength of light is formed within said cavity between said mirrors, and potentially producing light at other, unwanted wavelengths which potentially form other standing wave patterns, all of said wavelengths produced with a gain; and oscillation means for producing a continuous oscillatory change in resonant cavity length of said light path by varying the length of said light path a sufficient amount, causes the standing wave pattern of the desired output wavelength to oscillate as a traveling wave along said light path such that the standing wave pattern moves through at least the entire lengthwise extent of said gain material for extracting substantially all of the gain of said gain material, whereby only said desired output wavelength lases.

7. The laser of claim 6 wherein said light path length is varied at a predetermined frequency and modulation amplitude.

8. The laser of claim 6 wherein said oscillation means includes means for moving one of said mirrors.

9. The laser of claim 6 wherein said oscillation means includes means for moving said input mirror.

10. The laser of claim 6 wherein said oscillation means includes means for moving said output mirror.

11. The laser of claim 6 wherein oscillation of the traveling wave pattern corresponding to the desired output wavelength occurs over a modulation amplitude less than ±1% of the length of said light path.

12. The laser of claim 6 wherein said laser gain material is positioned in said light path at said predetermined location such that peaks in the particular standing wave corresponding to said desired output wavelength and potential peaks in the other standing wave patterns corresponding to said unwanted wavelengths do not overlap along said gain length, so that the variation of the length of said light path is sufficiently small as compared to the overall length of said light path to extract gain from the entire gain length of said laser gain material using only the desired output wavelength.

13. The laser of claim 12 wherein said laser gain material is positioned in said light path at a predetermined location substantially centered between said mirrors such that the particular standing wave corresponding to the desired output wavelength and the other standing wave patterns corresponding to the unwanted wavelengths are out of phase by a phase factor greater than 0 radians at said predetermined location.

14. A method of producing a single frequency end-pumped solid state laser, said method comprising the steps of:

providing an input mirror and an output mirror defining a resonant cavity and a light path within the resonant cavity and between the mirrors;

positioning a laser gain material at a predetermined location along said light path having a predetermined gain length arranged along the light path for producing light at a desired output wavelength such that a standing wave pattern at said desired output wavelength is formed within said resonant cavity between said mirrors, and potentially producing light at other, unwanted wavelengths which potentially form other standing wave patterns, all of said wavelengths produced with a gain; and producing a continuous oscillatory change in resonant cavity length of said light path to cause the standing wave pattern of the desired output wavelength to oscillate as a traveling wave along said light path such that the standing wave pattern moves through at least the entire gain length of said gain material for extracting substantially all of the gain from said gain material, whereby only said desired output wavelength lases.

15. The method of claim 14 wherein said step of varying the length of said light path is performed at a predetermined frequency and modulation amplitude.

16. The method of claim 15 wherein the oscillation of the traveling wave corresponding to the desired output wavelength occurs over a modulation amplitude less than ±1% of the length of said light path.

17. The method of claim 14 wherein said laser gain material is positioned in said light path at said predetermined location such that peaks in the particular standing wave corresponding to said desired output wavelength and potential peaks in the other standing wave patterns corresponding to said unwanted wavelengths do not overlap along said gain length, so that the variation of the length of said light path is sufficiently small as compared to the overall length of said light path to extracting gain from the full gain length of said laser gain material using only the desired output wavelength.

18. The method of claim 17 wherein said laser gain material is positioned in said light path at a predetermined location substantially centered between said mirrors such that the particular standing wave corresponding to the desired output wavelength and the other standing wave patterns corresponding to the unwanted wavelengths are out of phase by a phase factor greater than zero radians at said predetermined location.

19. A method of producing a single frequency end-pumped solid state laser, said method comprising the steps of:
providing an input mirror and an output mirrior defining a resonant cavity and a light path within the resonant cavity and between the mirrors:
using a thin laser gain material having a predetermined gain length of less than approximately two millimeters and positioned at a predetermined location along said light path to produce light at a desired output wavelength such that a standing wave pattern at said desired output wavelength is formed within said resonant cavity between said mirrors, and potentially producing light at other, unwanted wavelengths which potentially form other standing wave patterns, all of said wavelengths produced with a gain; and
producing a continuous oscillatory change in resonant cavity length of said light path to provide movement of the particular standing wave pattern of the desired output wavelength relative to said laser gain material so as to extract gain from the full gain length of the laser gain material using only said desired output wavelength such that only said desired output wavelength lases.

20. The method of claim 19 wherein said movement is performed at a predetermined frequency and modulation amplitude.

21. The method of claim 19 wherein said movement is provided by moving one of said mirrors.

22. The method of claim 19 wherein said movement is provided by moving said input mirror.

23. The method of claim 19 wherein said movement is provided by moving said output mirror.

24. The method of claim 19 wherein a traveling wave pattern corresponding to the desired output wavelength oscillates over a modulation amplitude less than ±1% of the length of said light path.

25. The method of claim 19 wherein said laser gain material is positioned in said light path at said predetermined location such that peaks in the particular standing wave corresponding to said desired output wavelength and potential peaks in the other standing wave patterns corresponding to said unwanted wavelengths do not overlap along said gain length, so that the variation of the length of said light path is sufficiently small as compared to the overall length of said light path to extract gain from the full gain length of said laser gain material using only the desired output wavelength.

26. The method of claim 25 wherein said laser gain material is positioned in said light path at a predetermined location substantially centered between said mirrors such that the particular standing wave corresponding to the desired output wavelength and the other standing wave patterns corresponding to the unwanted wavelengths are out of phase by a phase factor greater than zero radians at said predetermined location.

* * * * *